M. Gillam,
Horse Power.

Nº 20,421.  Patented June 1, 1858.

UNITED STATES PATENT OFFICE.

MICAH GILLAM, OF TROY, PENNSYLVANIA.

HORSE-POWER.

Specification of Letters Patent No. 20,421, dated June 1, 1858.

*To all whom it may concern:*

Be it known that I, MICAH GILLAM, of Troy, in the county of Bradford and State of Pennsylvania, have invented a new and useful Improvement in Horse-Powers; and I do hereby declare that the following is a full, clear, and exact description of the same, reference being had to the annexed drawings, making a part of this specification, in which—

Figure 2:
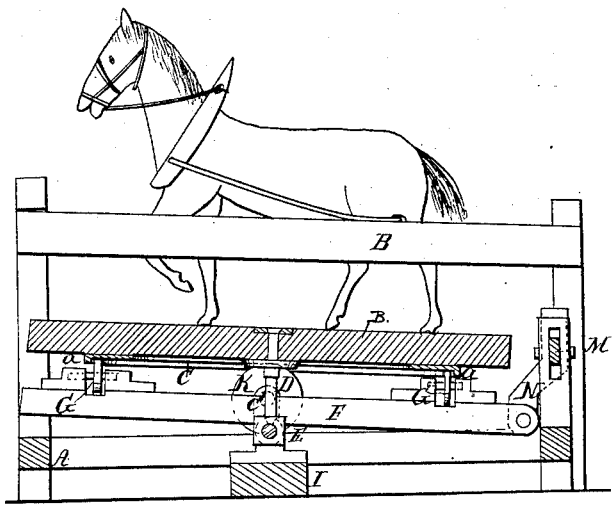
Figure 1:
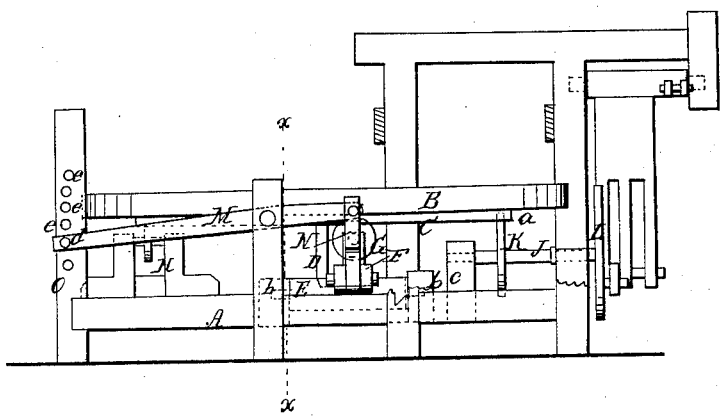

Figure 1, is a side view of my improvement. Fig. 2, is a transverse vertical section of ditto, taken in the line $(x)$, $(x)$, Fig. 1.

Similar letters of reference indicate corresponding parts in the two figures.

This invention relates to an improvement in that class of horse powers in which a rotating inclined wheel is used for transmitting the power of the animal to the machinery to be driven.

The invention consists in stepping the shaft of the wheel in an adjustable bar or shaft arranged as hereinafter shown, whereby the wheel may be placed in a horizontal position or in a position more or less inclined and the speed of the wheel thereby regulated as required.

To enable those skilled in the art to fully understand and construct my invention I will proceed to describe it.

A, represents a framing which may be constructed in any suitable manner to support the working parts of the machine.

B, is a wheel which may be constructed of planks in the usual way. To the under side of the wheel B, an annular metallic plate C, is attached, said plate having a flanch $(a)$ projecting down from its outer edge at right angles. D, is the axis or shaft of the wheel B. This axis or shaft projects from the underside of the wheel and is stepped in a bar or shaft E, which is allowed to turn freely in bearings $(b)$, $(b)$, in the lower part of the framing A.

To the bar or shaft E, a cross-tree F, is attached at right angles, and at each end of the cross tree F, there is placed a friction roller G, on which the wheel B rests,—said wheel also rests on a friction roller H, which is placed in the framing A at one end of a cross-bar I, which crosses the cross-tree F, at right angles. To the opposite end of the bar I, the inner bearing $(c)$ of a shaft J, is attached, the outer bearing being at the side of the framing. On the shaft J, a friction roller K, is placed on which the wheel B, rests or bears, and to the outer end of the shaft J, a crank L, is attached, or a pulley or gear wheel, for the purpose of taking the power therefrom.

To one end of the cross-tree F, a lever M, is attached by a link N, said lever being adjusted and secured at any desired height by a pin $(d)$ which passes through the outer end of the lever M, and into either of a series of holes $(e)$ made in an upright O, of the framing.

The operation is as follows: When the pin $(d)$ is removed from the lever M, the weight of the horse which is placed on the platform directly over the roller K, will incline the wheel B, to its fullest extent, and said wheel will have the same inclination of those usually employed in ordinary machines, the weight of the horse of course having a tendency to rotate the wheel so that the horse will be compelled to step with a quick movement and the wheel will be rotated with a certain constant speed due to the angle of the plane of its rotation. Therefore by raising the wheel B, which may be done through the medium of the lever M and cross tree F, and bar E, as shown, so that said wheel will approach a horizontal position the gravity of the horse will act less on the wheel and consequently its speed will be checked, the speed gradually decreasing as the wheel assumes a horizontal position, and when in a horizontal position the horse will be at perfect liberty to remain still for the wheel would then be rotated, if rotated at all by the muscular action of the animal only. This is an important improvement in the horse powers of the kind herein described, for as the speed of the wheel may be graduated as desired the horse may be favored at any time when necessary, the animal not being compelled to step at all times with a constant quick movement as has hitherto been the case, and the machinery may also at any time be operated or run with a greater or less speed as may be required and also quickly stopped.

Having thus described my invention what I claim as new and desire to secure by Letters Patent, is,

1. Arranging or hanging the wheel B, substantially as herein shown or in any suitable way, so that the plane of its rotation may be variably inclined for the purpose set forth.

2. I further claim the peculiar means herein shown and described for adjusting the wheel B, to wit, its axis or shaft D, being stepped in the shaft E, to which the cross-tree F is attached, the cross-tree F, being provided with friction rollers G, G, and connected with a lever M, substantially as described.

MICAH GILLAM.

Witnesses:
  I. A. Pierce,
  E. C. Oliver.